United States Patent

Tsuyama et al.

Patent Number: 5,082,081
Date of Patent: Jan. 21, 1992

[54] SLIP CONTROL APPARATUS OF A VEHICLE

[75] Inventors: Toshiaki Tsuyama; Toru Onaka, both of Hiroshima, Japan

[73] Assignee: Mazda Motor Corporation, Hiroshima, Japan

[21] Appl. No.: 679,131

[22] Filed: Mar. 28, 1991

Related U.S. Application Data

[63] Continuation of Ser. No. 587,550, Sep. 24, 1990, abandoned, which is a continuation of Ser. No. 386,160, Jul. 28, 1989, abandoned.

[30] Foreign Application Priority Data

Jul. 29, 1988 [JP] Japan .................. 63-191343

[51] Int. Cl.$^5$ .................................. B60K 23/00
[52] U.S. Cl. .................. 180/197; 364/426.02
[58] Field of Search ............ 180/197; 364/426.02

[56] References Cited

U.S. PATENT DOCUMENTS

| | | | |
|---|---|---|---|
| 4,762,196 | 8/1988 | Harada et al. | 303/106 X |
| 4,779,696 | 10/1988 | Harada et al. | 364/426.01 X |
| 4,790,607 | 12/1988 | Atkins | 303/100 |
| 4,834,205 | 5/1989 | Mizuno et al. | 180/141 |

FOREIGN PATENT DOCUMENTS

| | | | |
|---|---|---|---|
| 0297485 | 1/1989 | European Pat. Off. | 180/197 |
| 0031864 | 2/1988 | Japan | 180/197 |
| 0031869 | 2/1988 | Japan | 80/197 |

Primary Examiner—Charles A. Marmor
Assistant Examiner—Tamara L. Finlay
Attorney, Agent, or Firm—Fish & Richardson

[57] ABSTRACT

A driving torque adjusting system for adjusting a driving torque acting upon driven wheels, for example, a throttle valve for adjusting an output power or torque from the engine, is subjected to feed-back control at a set response velocity so as for an actual slip value of the driven wheel to reach a given target value. When the actual slip value of the driven wheel is equal to or larger than a set value larger than the target value, only the set response velocity in the direction of reducing the driving torque acting upon the driven wheels is corrected to become larger when the actual slip value is smaller than the set value. Preferably, the set response velocity is set smaller as a friction coefficient on a road surface is smaller in both cases where the torque acting upon the driven wheels is increased and decreased. An amount to correct the set response velocity, i.e., a magnitude of the set response velocity in the direction of reducing the driving torque, when the actual slip value of the driven wheel is equal to or larger than the set value becomes larger as the friction coefficient on the road surface is smaller.

13 Claims, 12 Drawing Sheets

SLIP CONTROL APPARATUS OF A VEHICLE

This application is a continuation of U.S. application Ser. No. 07/587,550, filed Sept. 24, 1990, now abandoned, which is a continuation of U.S. Ser. No. 07/386,160, filed July 28, 1989, now abandoned.

BACKGROUND OF THE INVENTION

1. Field of the Invention

The present invention relates to a slip control apparatus of a vehicle and, more particularly, to a slip control apparatus of a vehicle, as an automobile, adapted to control and prevent a slip of driven wheels of the vehicle and to improve a running stability.

2. Description of Related Art

Japanese Patent Application (laid-open) No. 31,864/1988 proposes a slip control apparatus of such a type that a slip of the driven wheels is effectively controlled and prevented by detecting a slip value of the driven wheels versus the undriven wheels and by carrying out a feedback control of a driving torque acting on the driven wheels at a given response velocity so as to change the slip value of the driven wheels to a target slip value, thereby preventing an action of an excessive driving torque. The slip control apparatus of this type is designed such that, when a friction coefficient $\mu$ on a road surface is low as on a road covered with snow, a response velocity of the feedback control is set low to lessen a change of driving torque and to become unlikely to cause a slip of the driven wheels. On the contrary, this apparatus is such that, when a road surface is more slippery, a response velocity in the direction of increasing the driving torque acting on the driven wheels is made smaller, thereby becoming unlikely to cause slipping.

U.S. Pat. Nos. 4,779,696 and 4,762,196 disclose another type of slip control apparatus. The slip control apparatus of the type disclosed in U.S. Pat. No. 4,779,696 is such that an actual slip value is subjected to feedback control to amount to a given target value and that the target value and an initial value of the target value are altered in accordance with a running state. The slip control apparatus of the type disclosed in U.S. Pat. No. 4,762,196 is such that a slip control is carried out by reducing output from the engine and applying a braking force to the driven wheels when an actual slip value of the driven wheels is large while it is carried out merely by reducing output of the engine when the actual slip value is small.

For the slip control apparatus as disclosed in Japanese Patent Publication No. 31,864/1988, if the driven wheels slip again to a relatively large extent during running on a road having a low friction coefficient $\mu$, the feedback control of the driving torque is carried out at a low response velocity corresponding to the low friction coefficient $\mu$ so that the driving torque acting upon the wheels is gradually adjusted to be decreased by means of the feed-back control. Accordingly, it will take a longer period of time in order to converge this slip that has occurred again so that demands have been made to control a slip as rapidly as possible from the very early stage of the slip of the driven wheels, thereby improving performance of converging the slip.

SUMMARY OF THE INVENTION

The object of the present invention is to provide a slip control apparatus of a vehicle adapted to ensure a running stability by minimizing a change in driving torque of the driven wheels during running on a road having a low friction coefficient $\mu$ as well as to improve performance of converging a slip by permitting a rapid convergence of a re-slippage of the driven wheels.

In order to achieve the object, the present invention consists of a slip control apparatus, comprising: a driving torque adjusting means for adjusting driving torque acting on a driven wheel; a slip detecting means for detecting a slip value of the driven wheel with respect to a road surface; a feed-back control means for subjecting said driving torque adjusting means to feed-back control at a set response velocity so as to allow the slip value detected by said slip detecting means to reach a given target value; and a response velocity altering means for altering said set response velocity in the direction of reducing the driving torque acting upon the driven wheel to become larger when the slip value detected by said slip detecting means is equal to or larger than a given set value larger than said target value, compared with when the slip value is smaller than said set value.

This arrangement permits a rapid convergence of a large degree of slippage of the driven wheels by means of the feedback control in a state that a set response velocity in a direction of decreasing the driving torque acting upon the driven wheel is accelerated when a large degree of slippage has occurred at the driven wheels while the set response velocity of the feedback control, namely, responsiveness, is set at an optimized level during ordinary circumstances.

Enlarging the set response velocity in a direction in which the driving torque is decreased cannot be effected as long as an actual slip value of the driven wheel is being converged to a level close to the target value. This prevents the worsening of acceleration.

Preferably, a basic set response velocity of the feedback control is set in accordance with a friction coefficient $\mu$ on pavement. More specifically, the smaller a friction coefficient $\mu$ is, in other words, the more slippery a road surface is, the smaller the set response velocity is set, whereby a change in the driving torque acting on the driving wheels is controlled so as to become smaller. When the actual slip value of the driven wheel reaches a level above the set value, a magnitude of the set response velocity to be in the direction in which the driving torque is decreased is made larger as the friction coefficient $\mu$ becomes smaller. This is preferred to rapidly converge a large degree of slippage.

This is achieved by a slip control apparatus of a vehicle, comprising: a driving torque adjusting means for adjusting driving torque acting on a driven wheel; a slip detecting means for detecting a slip value of the driven wheel with respect to a road surface; a feed-back control means for subjecting said driving torque adjusting means to feed-back control at a set response velocity so as to allow the slip value detected by said slip detecting means to reach a given target value; a friction coefficient detecting means for detecting a friction coefficient on the road surface; a first response velocity altering means for altering said set response velocity to a value smaller when the friction coefficient detected by said friction coefficient detecting means is smaller than when the friction coefficient is larger; a second response velocity altering means for altering said set response velocity in the direction of reducing the driving torque acting upon the driven wheel to become larger when the slip value detected by said slip detecting means is equal to or larger than a given set value larger than said target value, compared with when the slip value is smaller than said set value; and an amount altering means for altering an amount to be altered by said second response velocity altering means to become larger when the friction coefficient detected by said friction coefficient detecting means is smaller than when said friction coefficient is larger.

More preferably, the driving torque acting upon the driven wheels is rapidly reduced by means of the feed-forward control prior to the feed-back control in order to converge a large degree of slippage of the driven wheels as soon as possible immediately after the start-up of the slip control, namely, at an initial stage of the slip control. The more preferable embodiment according to the present invention may be achieved by a slip control apparatus of a vehicle, comprising: a driving torque adjusting means for adjusting driving torque acting on a driven wheel; a slip detecting means for detecting a slip value of the driven wheel with respect to a road surface; a first slip control means for reducing the driving torque acting upon the driven wheel rapidly by a given portion by subjecting said driving torque adjusting means to feed-forward control when the slip value detected by said slip detecting means becomes above a first set value; a second slip control means for subjecting said driving torque adjusting means to feed-back control at a set response velocity so as to allow the slip value detected by said slip detecting means to reach a given target value smaller than said first set value after control by means of said first slip control means; and a response velocity altering means for altering said set response velocity in the direction of reducing the driving torque acting upon the driven wheel to become larger during slip control by means of said second slip control means when the slip value detected by said slip detecting means is equal to or larger than a second set value larger than said target value, compared with when the slip value is smaller than said second set value.

Other objects, features and advantages of the present invention will become apparent in the course of the description on the preferred embodiments which follows, with reference to the accompanying drawings.

DESCRIPTION OF THE PREFERRED EMBODIMENTS

The present invention will be described more in detail by way of examples with reference to the accompanying drawings.

Figure 1:
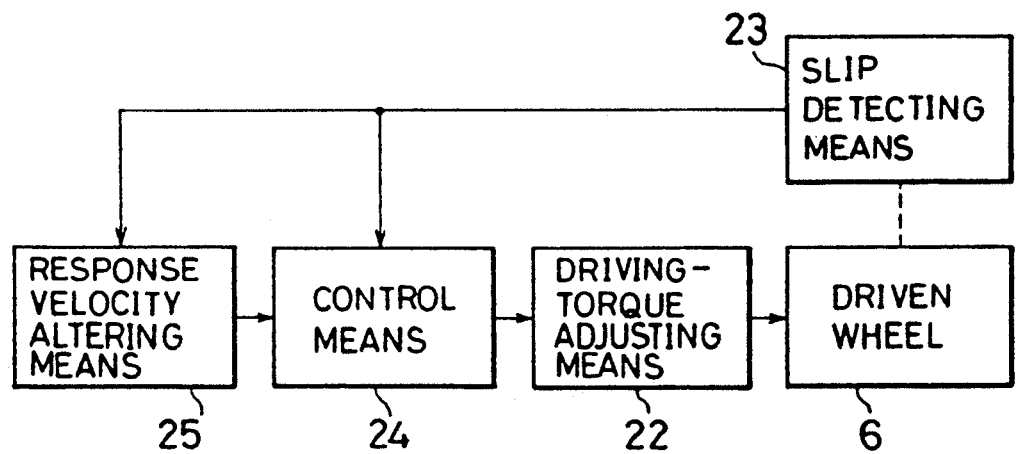
FIG. 1 is a schematic block representation showing an outline of the construction of the present invention.
Figure 2:
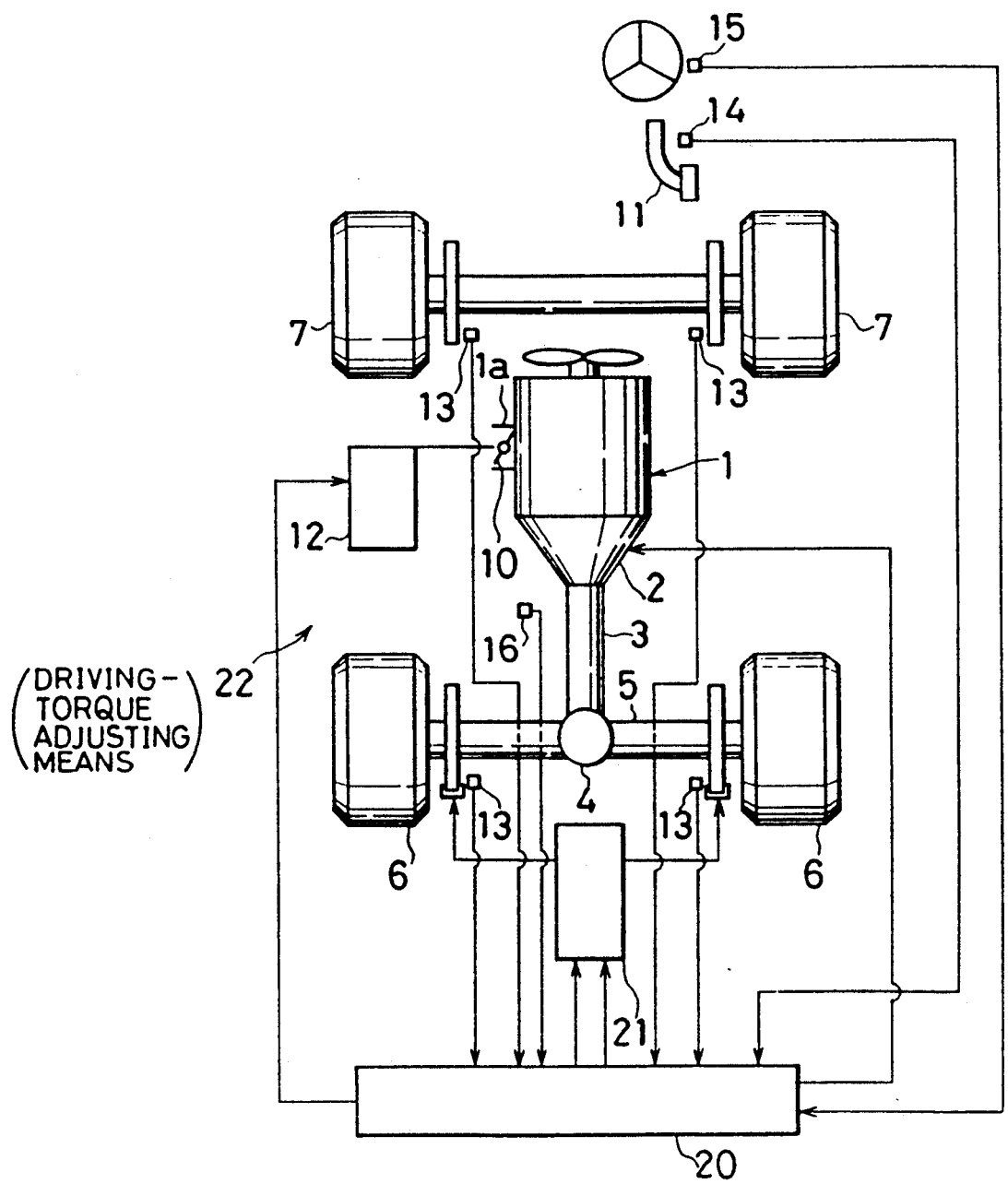
FIG. 2 is a schematic view showing an outline of the structure according to one example of the present invention.

As shown in FIG. 2, reference numeral 1 denotes an engine of the Otto type and reference numeral 2 denotes an automatic transmission. The power generated by the engine 1 and shifted by automatic transmission 2 is transmitted through a propeller shaft 3 disposed rearward of the transmission 2, a differential 4 and a rear wheel shaft 5 to left-hand and right-hand rear wheels 6, 6. This vehicle is of the type in which the rear wheels 6, 6 are driven wheels and front wheels 7, 7 are undriven wheels. In this embodiment, the automatic transmission 2 is of four forward speed ranges and one reverse speed range.

On an intake air passage $1a$ of the engine 1 is mounted a throttle valve 10 for adjusting an output power from the engine 1 by regulating an amount of intake air. The throttle valve 10 is not mechanically connected to an accelerator pedal 11 and is electrically controlled so as to adjust its opening by means of a throttle actuator 12 consisting of a stepping motor or the like.

At positions nearby or in a vicinity of the left-hand and right-hand rear wheels 6, 6 and the left-hand and front wheels 7, 7 are mounted each a wheel velocity sensor, generally referred to as 13, for sensing a rotational velocity of each of the respective wheels, an opening degree sensor 14 for sensing an opening degree of the accelerator pedal 11, a steered angle sensor 15 for sensing a steered angle of the respective wheels, and an acceleration sensor 16 for sensing acceleration of the vehicle. Signals from the sensors 13 to 16 are given a controller 20 containing a central processing unit (CPU), and the controller 20 controls an opening degree of the throttle valve 10 by means of the throttle actuator 12 to thereby control the output from the engine preventing a slippage of the rear wheels 6,6.

To the controller 20 is connected a brake actuator 21 for adjusting a braking liquid pressure acting on the left-hand and right-hand rear wheels 6 and 6, and, when a large degree of slippage occurs, the slippage is regulated by controlling the braking liquid pressure as well as controlling the output from the engine.

A driving torque adjusting means 22 is to adjust a driving torque acting on the driven wheels 6 and 6 by controlling the opening degree of the throttle valve, i.e., the engine output, by means of the throttle actuator 12 and the braking liquid pressure by means of the brake actuator 21.

A slip control by means of the controller 20 will be described more in detail with reference to FIGS. 3 and 11.

Figure 3:
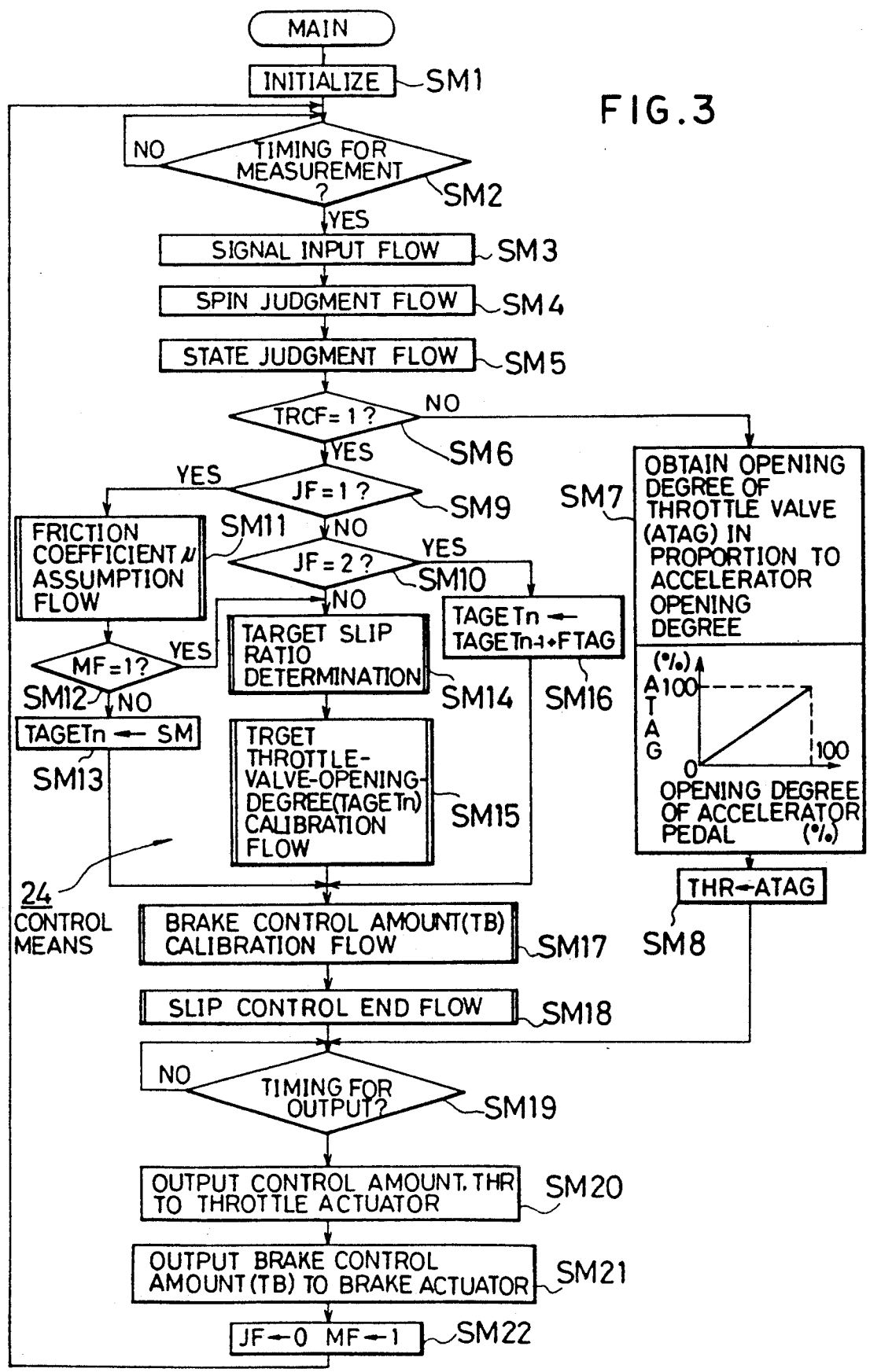
FIGS. 3 to 11 each is a flow chart showing an example of a slip control of the driven wheel by means of a controller.

FIG. 3 (Main Routine)

As shown in FIG. 3, the system is initialized at step SM1. At step SM2, the timing of measurement is determined and then at step SM3, signals from the sensors are given. At step SM4, a spin of the driven wheel is judged in accordance with a spin judgment flow of FIG. 4 and, at step SM5, a state of this spin is judged in accordance with the spin state judgement flow of FIG. 5.

Then at step SM6, it is judged whether or not slip control is in the progress on the basis of a value of the traction flag TRCF. If the value of the flag is TRCF=0, namely, the slip control is not in the progress, a target opening degree of the throttle valve, ATAG, corresponding to the opening degree of the accelerator pedal 11 is given at step SM7, and its value ATAG is given as an output value THR to the throttle actuator.

If it is judged at step SM6 that the slip control is in the progress, then at steps SM9 and SM10, a state of the spin is judged on the basis of a value of the state flag JF. If JF=1 and it is judged that a spin has occurred immediately before this judgment, then at step SM11, a friction coefficient $\mu$ on pavement is judged on the basis of the friction coefficient assumption flow of FIG. 6. At step SM12, it is judged whether or not the state flag JF is "1". Only when JF=0, namely, the spin is determined as a first slip after commencement of the slip control, the flow proceeds to step SM13 where the target opening degree of the throttle valve TAGETn for the slip control is set at a given smaller opening degree value SM in order to immediately reduce the opening degree of the throttle valve (a first slip control and a feed-forward control).

If the spin is not the first one (the first flag MP1), the opening degree of the throttle valve is subjected to feed-back control (second slip control). In other words, at step SM14, a target slip ratio is calibrated on the basis of the target slip ratio determination flow of FIG. 7 and, at step SM15, the target opening degree of the basis of the target throttle valve opening degree calibration flow of FIG. 8.

If JF=2, or the spin is immediately after convergence, the opening degree of the throttle valve is immediately returned to a large extent at step SM16. In other words, the current target opening degree of the throttle valve TAGETn is renewed to an addition of the previous value TAGETn−1 and a recovery opening degree value FTAG (a value to be calibrated in step SC2 of FIG. 6 as will be described hereinbelow). This is a third slip control, and a feed-forward control.

Figure 10:
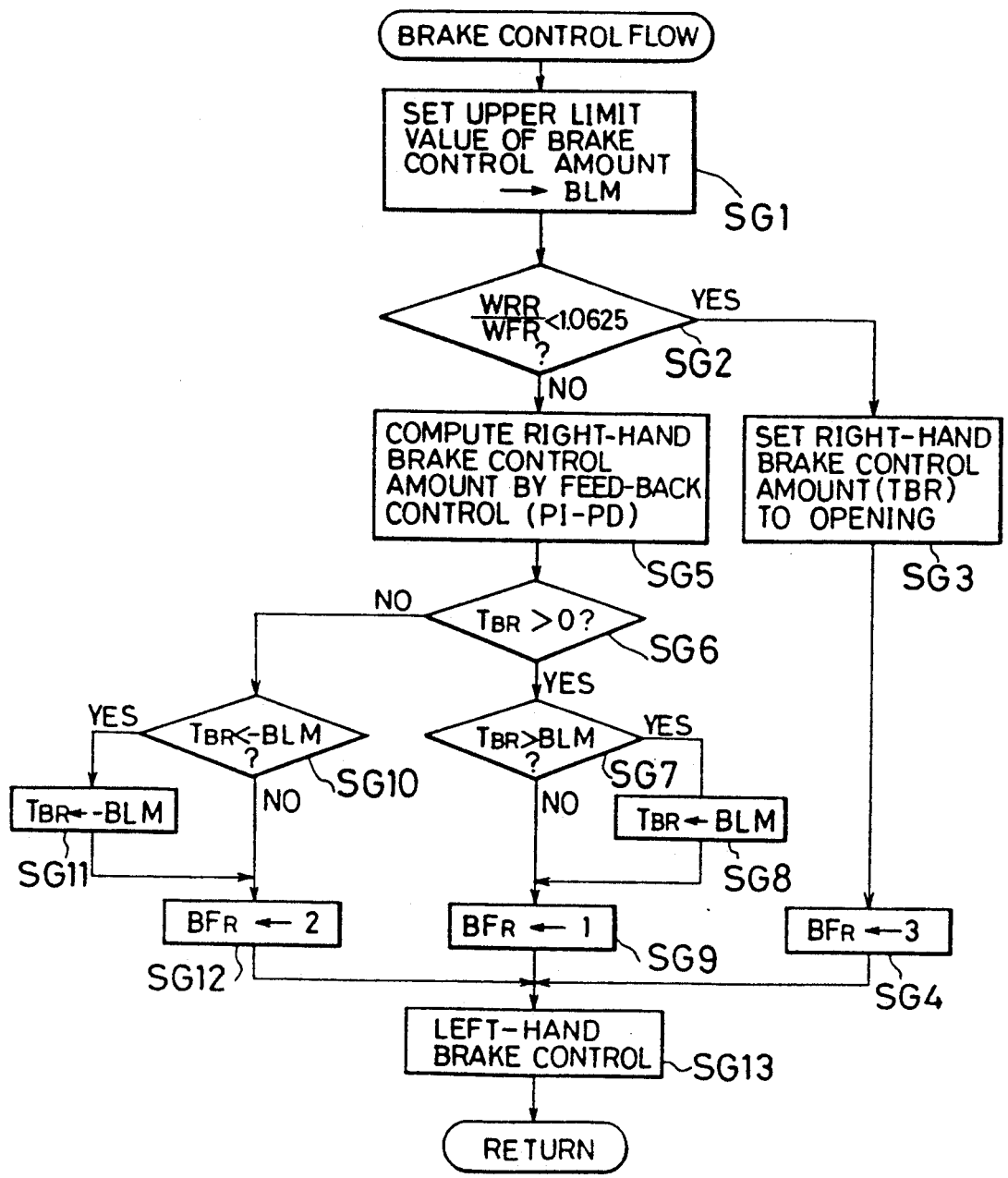

Thereafter, at step SM17, in order to regulate an excessive amount of driving torque at the time of occurrence of a spin by means of the brake control, a brake control amount TB is calibrated on the basis of the brake control flow of FIG. 10. The flow then proceeds to step SM18 where it is judged whether or not the slip control should be ended on the basis of the slip control end judgment flow of FIG. 11.

In order to control a braking hydraulic pressure acting actually on the throttle valve 10 and the driven wheels 6 and 6, it is judged at step SM19 whether or not the timing is for generating a control signal and, if it is judge that it is the timing therefor at step SM19, the flow proceeds to step SM20 where a control amount of the throttle valve, THR, is generated to the throttle actuator 12 and, at step SM21, a brake control amount, TB, is generated to the brake actuator 21. Then at step SM22, the spin state flag JF is set at JF=0 and the first spin flag MF is set to MF=1, the flow is returned to step SM2. This process is repeated.

Spin Judgment Flow

Figure 4:
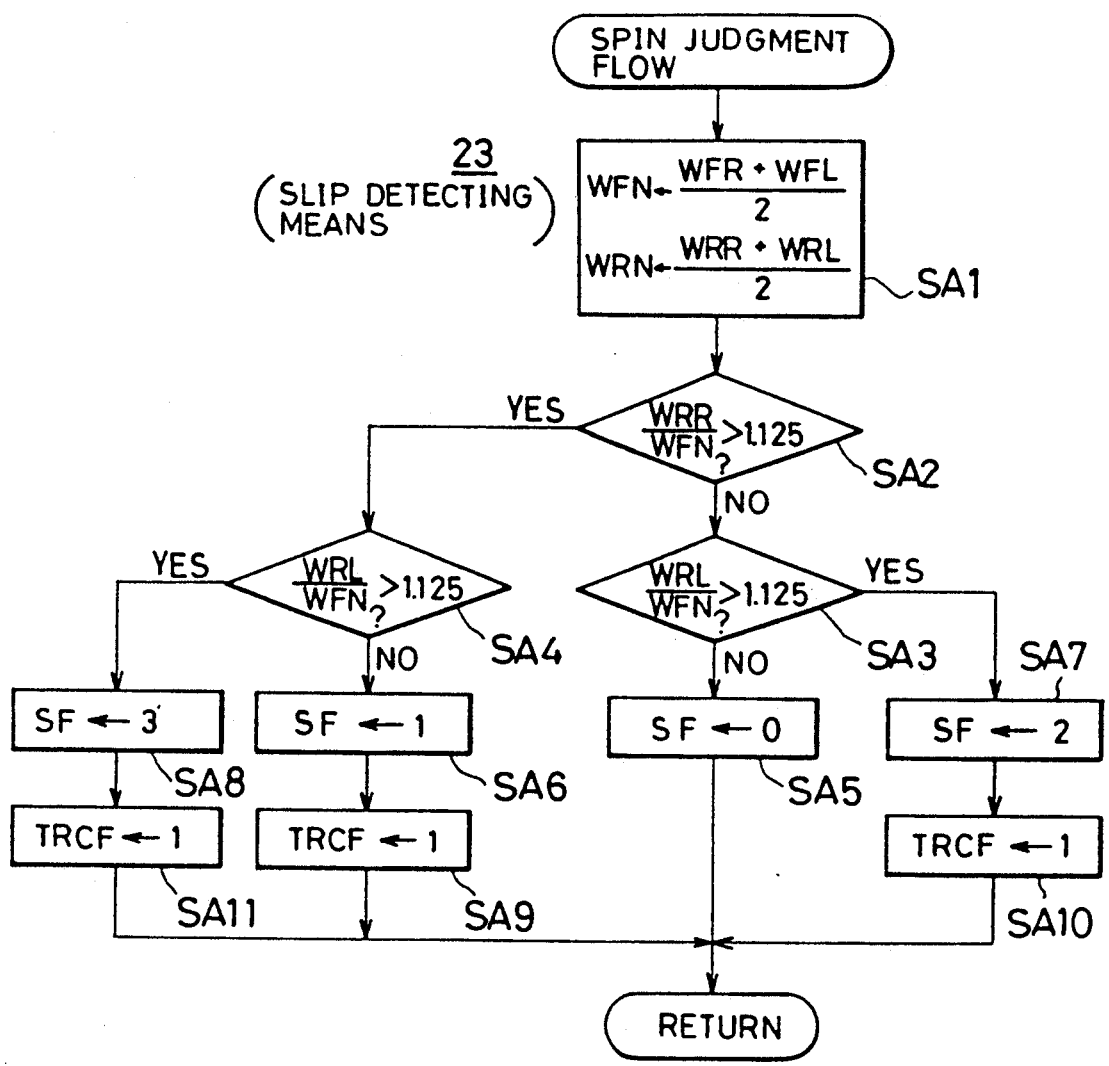

FIG. 4 corresponding to SM4 of FIG. 3

At step SA1, an average front wheel velocity WFN is given by averaging the right-hand front wheel velocity WFR and the left-hand front wheel velocity WFL. Then slip ratios S of the right-hand rear wheel velocity (WRR) and of the left-hand rear wheel velocity (WRL) to the average front wheel velocity (WFN) are judged whether or not to be larger than a spin judgment value S1. At step SA2, the slip ratio S of the right-hand rear wheel velocity WRR to the average front wheel velocity WFN, i.e., WRR/WFN, is compared with a spin judgment value S1 (for example, S1=1.124) nearby the maximum value (S=1.25). If the ratio WRR/WFN is not larger than the value S1, then at step SA3, the ratio WRL/WFN is compared with the spin judgment value S1. If the ratio WRL/WFN is not larger than the value S1, namely, if the slip ratios S of both the rear wheel velocities are determined to be below the spin judgment value S1, it means that the running state is good in which no slip occurs so that the flow proceeds to step SA5 where the spin flag SF is set to SF=0.

If the ratio WRR/WFN is larger than the value S1, then at step SA4, it is judged whether or not the ratio WRL/WFN is larger than the value S1. If the ratio WRL/WFN is not larger than the value S1, namely, if it is judged that only the right-hand rear wheel spins, the flow then proceeds to step SA6 where the spin flag SF is set to SF=1.

When at step SA3 it is determined that the ratio WRL/WFN is larger than the value S1, namely, if it is judged that only the left-hand rear wheel spins, the spin flag SF is set to SF=2 at step SA7.

Furthermore, if it is judged that both the right-hand and left-hand rear wheels spin, namely, when both the ratios WRR/WFN and WRL/WFN are larger than the value S1, the flow then advances to step SA8 and the spin flag SF is set to SF=3. At steps SA9, SA10, and SA11, traction flag TRCF is set to TRCF=1 in each case where the spin flag has been set to SF=1, SF=2, and SF=3, respectively. The flow is then returned.

Spin State Judgment Flow

Figure 5:
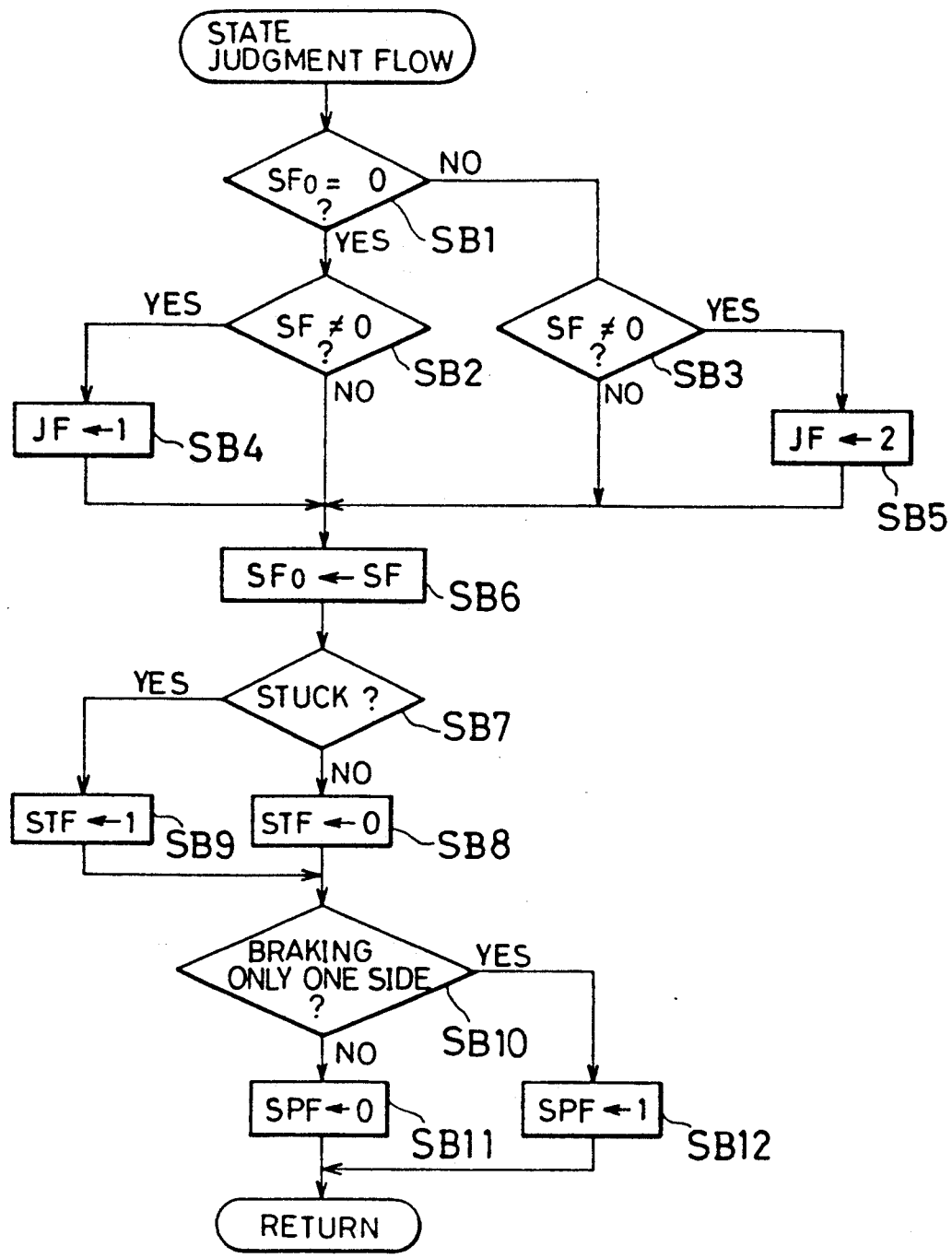

FIG. 5 corresponding to SM5 of FIG. 3

At step SB1, a value of the previous spin flag SFo is judged and, if SFo=0, the flow proceeds to step SB2 where a value of the latest spin flag SF is judged. When it is judged at step SB2 that the latest spin flag SF is SF≠0, namely, when it is judged that the spin has occurred immediately before, then the flow proceeds to step SB4 and the spin state flag JF is set to JF=1. Then the flow proceeds to step SB6. On the contrary, if NO at step SB2, i.e., SF=0, the flow advances to step SB6.

If it is judged at step SB1 that the previous spin flag SFo is not SFo=0, the flow advances to step SB3 where it is judged whether or not the latest spin state flag SF is SF≠0. If YES at step SB3, i.e., SF=0 (immediately after occurrence of a spin), the flow proceeds to step SB5 where the spin state flag JF is set to JF=2 and the flow then advances to step SB6. If NO at step SB3, then flow proceeds to step SB6.

Then at step SB6, the value of the latest spin flag SF is updated to the previous value SFo. At step SB7, it is judged whether or not the vehicle is in the progress of being stuck. If it is judged at step SB7 that the vehicle is not being stuck, the stuck flag STF is set to STF=0 at step SB8 while, when it is judged at step SB7 as being stuck, the stuck flag STF is set to STF=1 at step SB9. Thereafter, the flow proceeds to step SB10.

At step SB10, it is judged whether or not the braking force is acting only on the one side of the left-hand and right-hand rear wheels (in the case of split road). If NO at step SB10, namely, if it is judged that it is not split road, the split flag SPF is set to SPF=0 at step SB11 and then returned. If it is judged at step SB10 that it is the split road, the split flag SPF is set to SPF=1 at step SB12 and then returned.

Friction Coefficient μ Assumption Flow

Figure 6:
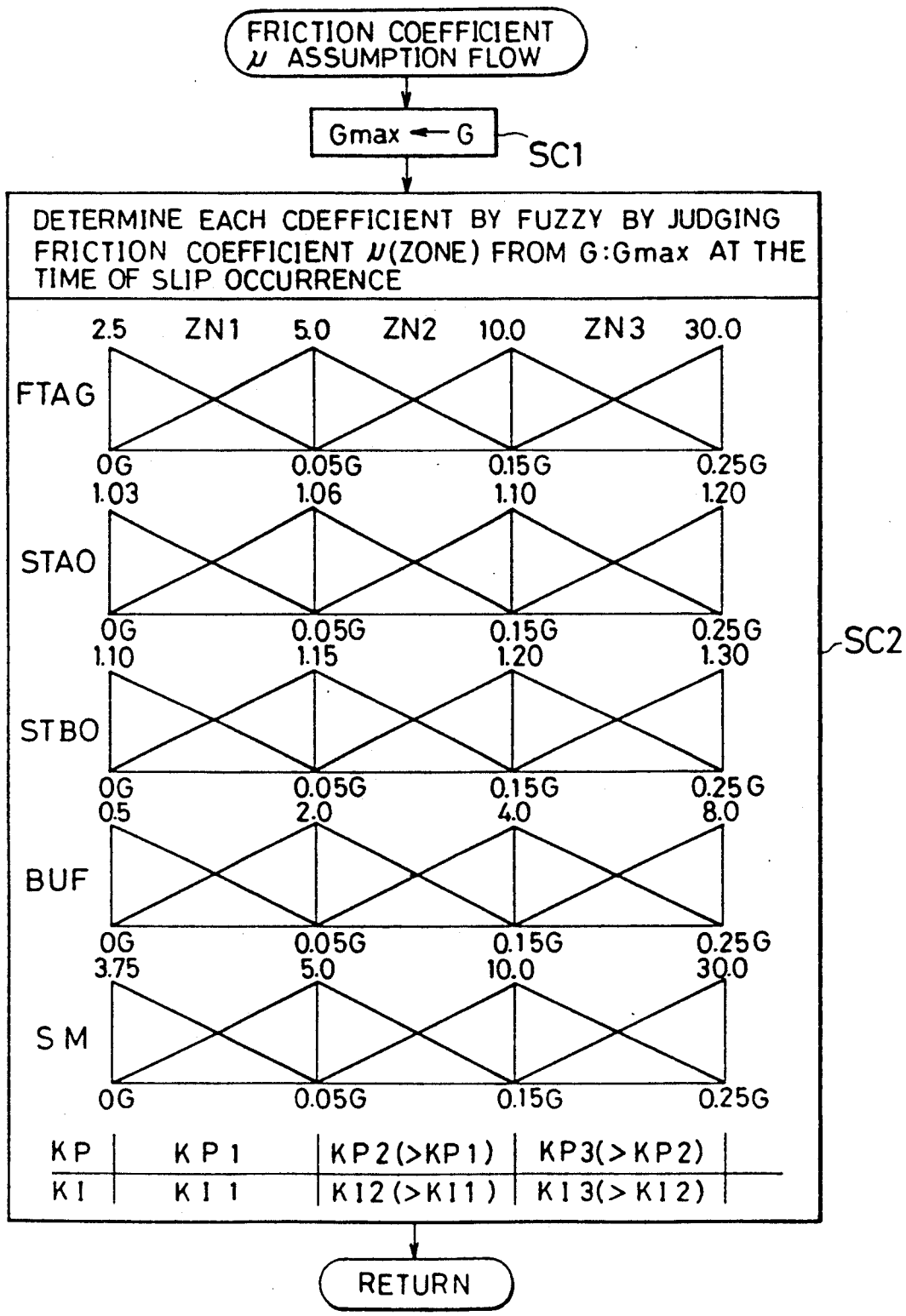

FIG. 6 corresponding to SM11 of FIG. 3

In the friction coefficient μ assumption flow as shown in FIG. 6, a maximum value Gmax of acceleration G in the forward or rearward direction of the vehicle immediately after occurrence of a slip is obtained on the basis of output from the acceleration sensor 16 at step SC1. Then at step SC2, the maximum acceleration Gmax is divided into three zones in accordance with the friction coefficient μ on pavement, a first zone ZN1 being OG≦Gmax<0.05 G), a second zone ZN2 being 0.05≦Gmax<0.15 G), and a third zone ZN3 being 0.15 G≦0.25 G) (where G is acceleration of gravity). In each of the zones, a recovery opening degree FTAG (corresponding to an incremental portion of the opening degree immediately after convergence of the slip), a basic target slip ratio STAO of the driven wheels in the engine output control, a basic target slip ratio STBO of the driven wheels in the brake control, an incremental portion (back-up opening degree), BUF, of the opening degree during the control for increasing the opening degree of the throttle valve, and an opening degree SM to be forcibly returned immediately after occurrence of the first spin are each computed by means of the FUZZY control in step SC2 and further set proportional constant KP and integral constant KI at a value corresponding to each of the zones by means of the feed-back control of the opening degree of the throttle valve. Then the flow is returned.

Target Slip Ratio Determination Flow

Figure 7:
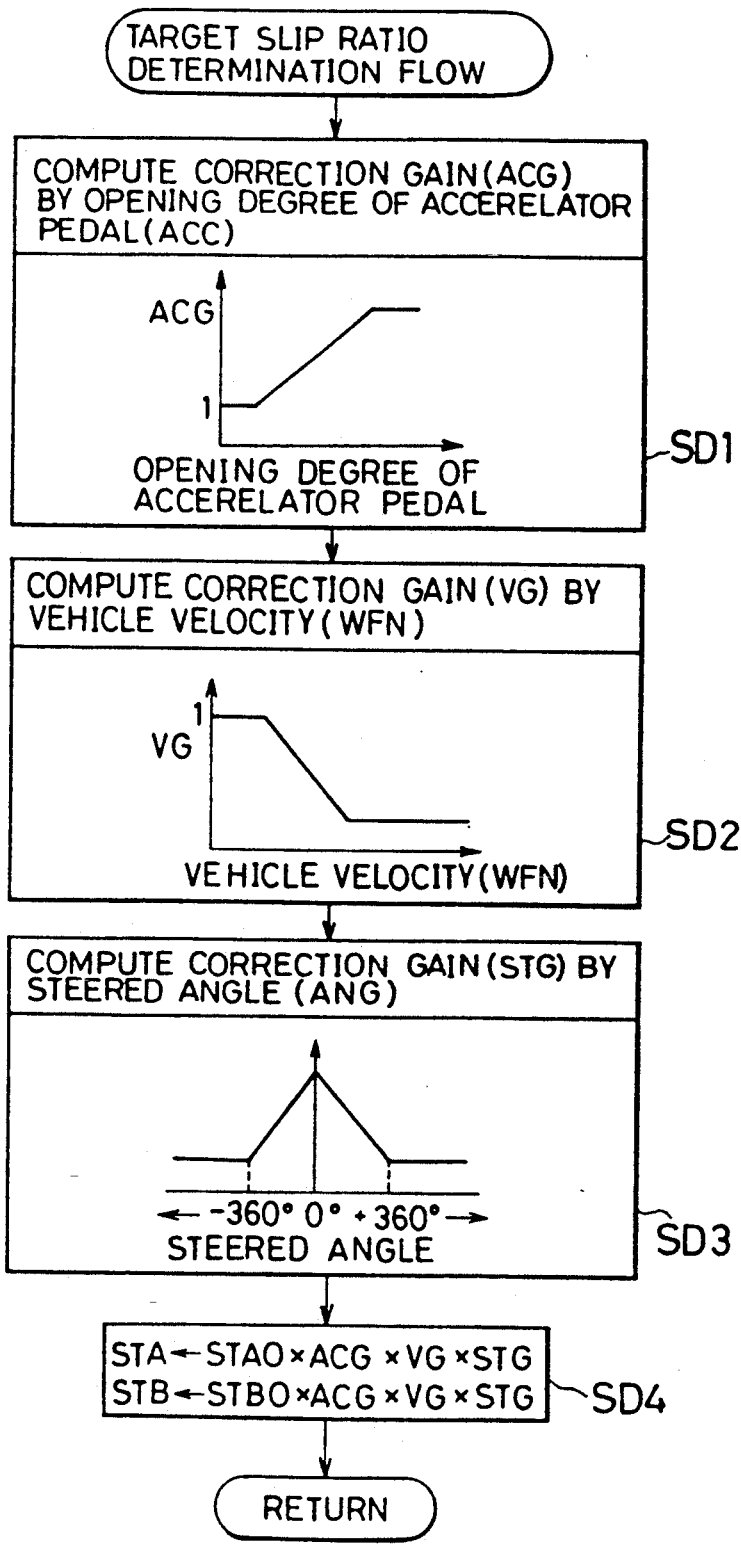

FIG. 7 corresponding to SM14 of FIG. 3

In the target slip ratio determination flow as shown in FIG. 7, the basic target slip ratio STAO in the output control of the engine and the basic target slip ratio STBO computed on the basis of the friction coefficient μ assumption flow of FIG. 6 are corrected. More specifically, at step SD1, an accelerator pedal correction gain ACG is computed which increases from the reference value (=1) in proportion to the opening degree of the accelerator pedal, ACC. Then at step SD2, a vehicle velocity correction gain VG is computed which decreases from the reference value (=1) in accordance with the vehicle velocity (undriven wheel velocity WFN). Furthermore, at step SD3, a steered angle correction gain STG is computed which decreases from the reference value (=1) in proportion to an operation amount (steered angle) of a steering wheel, ANG.

Then at step SD4, each of the basic target slip ratios STAO and STBO is corrected by multiplying it by each of the correction gains ACG, VG, and STG, and the respective operation results are renewed to STA and STB. The flow is then returned.

Target Throttle Valve Opening Degree Calibration Flow

Figure 8:
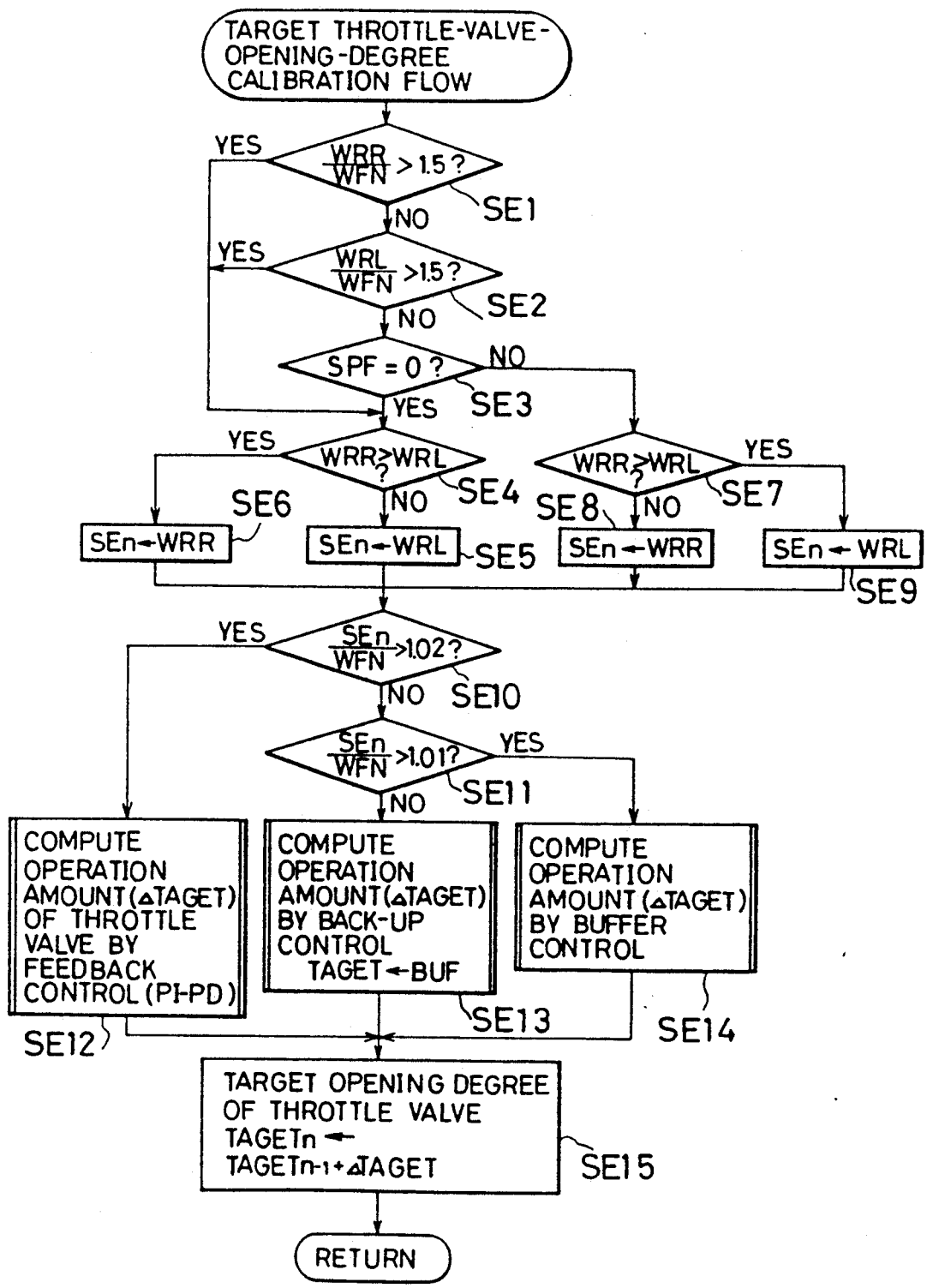

FIG. 8 corresponding to SM15 of FIG. 3

First, at step SE1, it is judged whether or not a slip ratio SR of the right-hand driven wheel 6 to the vehicle velocity, i.e., WRR/WFN, exceeds a maximum set slip ratio S5 (for example, 1.5). If the ratio WRR/WFN is not larger than the maximum set slip ratio S5, the flow proceeds to step SE2 where it is further judged whether or not a slip ratio SL of the left-hand driven wheel 6 to the vehicle velocity, i.e., WRL/WFN, exceeds the maximum set slip ratio S5 (for example, 1.5). If NO at step SE2, it is then judged at step SE3 whether or not the vehicle is running on a split road, namely, SPF=0.

When it is judged that the slip ratio SR is above the set slip ratio S5 at step SE1, that the slip ratio SL is larger than the set slip ratio S5 at step SE2, and that SPF=0 (not running on the split road) at step SE3, the flow proceeds in each case to step SE4 where it is judged whether or not the right-hand driven wheel velocity WRR is faster than the left-hand driven wheel velocity WRL. If YES at step SE4, the flow advances to step SE6 where the right-hand driven wheel velocity WRR faster than the left-hand one WRL is given as a driven wheel velocity SEn. If NO at step SE4, the left-hand driven wheel velocity WRL faster than the right-hand one WRR is given as a driven wheel velocity SEn at step SE5.

In other words, as is apparent from the procedures from step SE4 to SE5, while the vehicle is not running on a split road, a whichever faster velocity, right-hand or left-hand driven wheel velocity is forcibly given as a driven wheel velocity SEn that is the object to be controlled.

If NO at step SE3, namely, if it is judged that the vehicle is running on the split road, the flow proceeds to step SE7 where it is judged which is faster, the right-hand driven wheel velocity WRR or the left-hand driven wheel velocity WRL. If NO at step SE7, the right-hand driven wheel velocity WRR which is slower than the left-hand one WRL is given as a driven wheel velocity SEn, while the left-hand driven wheel velocity WRL is given as a driven wheel velocity SEn when it is judged at step SE7 that the right-hand driven wheel velocity WRL is faster than the left-hand one WRL. In other words, while the vehicle is running on the split road, it is running by means of the driven wheel 6 located on the side larger in a friction coefficient μ than the other driven wheel 6, so that a whichever slower driven wheel velocity, WRR or WRL, is set as a driven wheel velocity SEn that is the object to be controlled.

In either case, at steps SE10 and SE11, a slip ratio S of the driven wheel velocity SEn to the vehicle velocity WFN, i.e., SEn/WFN, is compared with a given slip ratio S3 (for example, S3=1.02) and with a given slip ratio S4 (for example, S4=1.01), respectively.

More specifically, if the slip ratio S is larger than 1.02 at step S10, the flow proceeds to step SE12 and an operation amount (an incremental portion) of the throttle valve, ΔTAGET, by means of the feed-back control (PI-PD control) is computed. If NO at step SE10, the slip ratio S is further judged whether or not to be larger than 1.01. If the slip ratio S is equal to or smaller than 1.01, the given value BUF obtained in the friction coefficient μ assumption flow of FIG. 6 is computed at step SE13 as an operation amount of the throttle valve ΔTAGET, in order to forcibly increase (back-up control) the opening degree of the throttle valve gradually by the given value BUF. If the slip ratio S is equal to or smaller than 1.02 and larger than 1.01, the operation amount of the throttle valve, ΔTAGET, is computed at step SE14 in order to carry out the control (buffer control) for executing a smooth transfer from the back-up control to the feed-back control.

Then at step SE15, the latest target throttle valve opening degree, TAGETn, is computed as an addition of the previous throttle valve opening degree, TAGETn−1, and the operation amount of the throttle valve, ΔTAGET. Thereafter, the flow is returned.

Feed-Back Control of Engine

Figure 9:
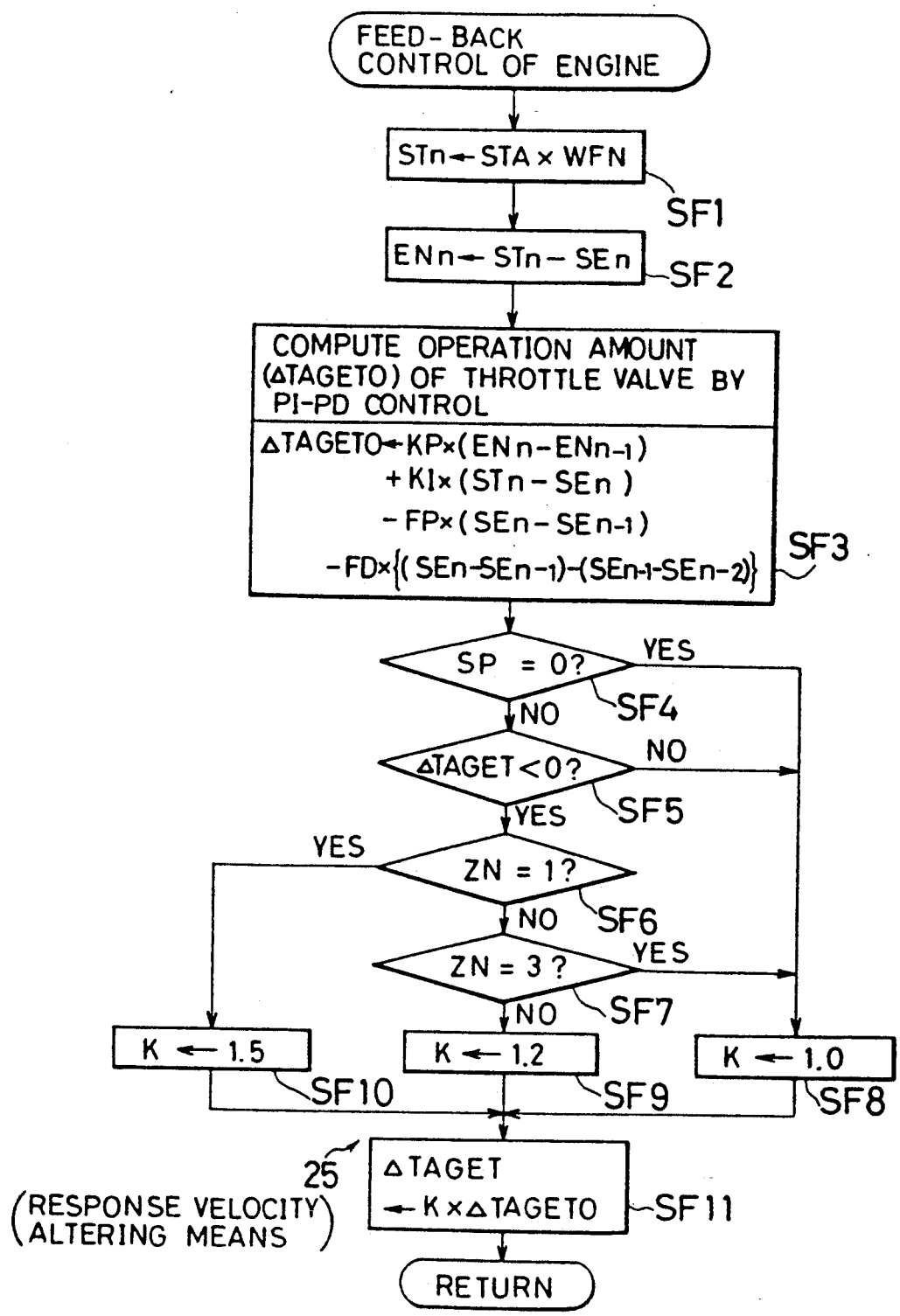

FIG. 9 corresponding to SM12 of FIG. 8

In the feed-back control of the engine as shown in FIG. 9, a target driven wheel velocity STn is computed by multiplying the target slip ratio STA in the engine control by the vehicle velocity WFN at step SF1. Then at step SF2, a control deviation ENn is computed by subtracting a latest driven wheel velocity SEn from the target driven wheel velocity STn.

Thereafter, a basic operation amount of the throttle valve, ΔTAGETo, by means of the PI-PD control is computed on the basis of proportional constants KP and FP, integral constant KI, and differential constant FD, in accordance with the formula as shown in step SF3 in FIG. 9. It is to be noted herein that the proportional constant KP and the integral constant KI may vary with the friction coefficient μ on pavement as shown in the flow of FIG. 6 and that the smaller the friction coefficient μ, the lower the constants are set. Thus, the basic operation amount of the throttle valve, ΔTAGETo, is set at a smaller value as the friction coefficient μ on pavement gets smaller. Therefore, a change of the opening degree of the throttle valve becomes slower as the friction coefficient is smaller, whereby the driving torque acting upon the driven wheels 6 becomes slower, too, preventing a re-slippage on the side of the driven wheels 6 and ensuring a running stability of the vehicle on pavement having a low friction coefficient μ.

At step SF4 and steps which follow, in order to compete with the re-slippage, a response velocity in the feed-back control of the opening degree of the throttle valve is changed by correcting the basic operation amount of the throttle valve, Δ TAGETo (an amount of the opening degree of the throttle valve per one operation). More specifically, it is judged whether or not a spin is currently in the progress (SP=0) at step SF4, whether or not the operation amount of the throttle valve, Δ TAGET, is smaller than 0 (Δ TAGET<0) at step SF5, and what is the zone at steps SF6 and SF7. If it is judged that the spin is now in the progress (SP=0), Δ TAGET≧0 (in other words, when the throttle valve is controlled so as to increase its opening degree), and the zone is ZN3 (in other words, the friction coefficient μ is high as on an asphalt road), the gain K is set to K=1.0 at step SF8. If the zone is set at ZN2 (for example, as on a snow-covered road), in Δ TAGET<0 (when the throttle valve is controlled so as to decrease its opening degree) at the time of occurrence of a spin, the gain K is set to K=1.2 at step SF9. Furthermore, if the zone is ZN1 (for example, as on a frozen road), the gain K is set to K=1.5 at step SF10.

Thereafter, the basic operation amount of the throttle valve, Δ TAGET, is computed by multiplying the basic operation amount of the throttle valve, Δ TAGETo, by the above gain K. The flow is then returned.

Brake Control Flow

FIG. 10 corresponding to SM17 of FIG. 3

At step SG1, an upper limit value BLM of a brake control amount (the maximum value of a range of variation) is set in order to prevent a shock due to a rapid increase or decrease of braking hydraulic pressures.

Then at step SG2, the slip ratio S of the right-hand driven wheel velocity WRR to the vehicle velocity WFN, i.e., WRR/WFN, is compared with the given value S5 (for example, S5=1.0625), in order to control the right-hand braking pressure. When the slip ratio S is smaller than 1.0625, namely, when a degree of slippage is small, the brake control is suspended and the flow advances to step SG3 where a brake control amount TBR of the right-hand driven wheel is set to opening (zero). Then at step SG4, the right-hand brake flag BFR is set to BFR=3 (opening).

If it is judged at step SG2 that the slip ratio is equal to or larger than 1.0625, namely, when a degree of slippage is large, the brake control amount TBR acting on the right-hand driven wheel by means of the feed-back control (PI-PD control) is computed at step SG5. Thereafter, at step SG6, it is judged that the braking pressure is to be increased when the brake control amount TBR is larger than 0 (TBR>0), the flow proceeds to step SG7 and it is judged whether or not the control amount TBR is larger than the upper limit value BLM. If the control amount TBR is judged to be larger than the upper limit value BLM at step SG7, then the control amount TBR is restricted to the upper limit BLM at step SG8 and the right-hand brake flag BFR is set at step SG9 to BFR=1 in order to indicate the timing for increasing pressures. When it is judged at step SG7 that the control amount TBR is not larger than the upper limit value BLM, the flow advances to step SG9 where the right-hand brake flag BFR is set to BFR=1.

If the control amount TBR is smaller than zero (TBR<0) at step SG6, it is judged that the braking pressure should be decreased and, at steps SG10 and SG11, the control amount TBR is restricted to the lower limit value −BLM when the control amount TBR is smaller than the lower limit value −BLM. Then at step SG12, the right-hand brake flag BFR is set to BFR=2 (indicating the time when the braking pressure should be decreased). If the control amount TBR is not smaller than the lower limit value −BLM, the flow proceeds directly to step SG12 and the right-hand brake flag BFR is likewise set to BFR=2 in order to indicate the timing for decreasing pressures.

Thereafter, the left-hand brake control is carried out in substantially the same manner as the right-hand brake control as have been described hereinabove by computing the brake control amount TBL of the left-hand driven wheel. Then the flow is returned.

Slip Control End Judgment Flow

Figure 11:
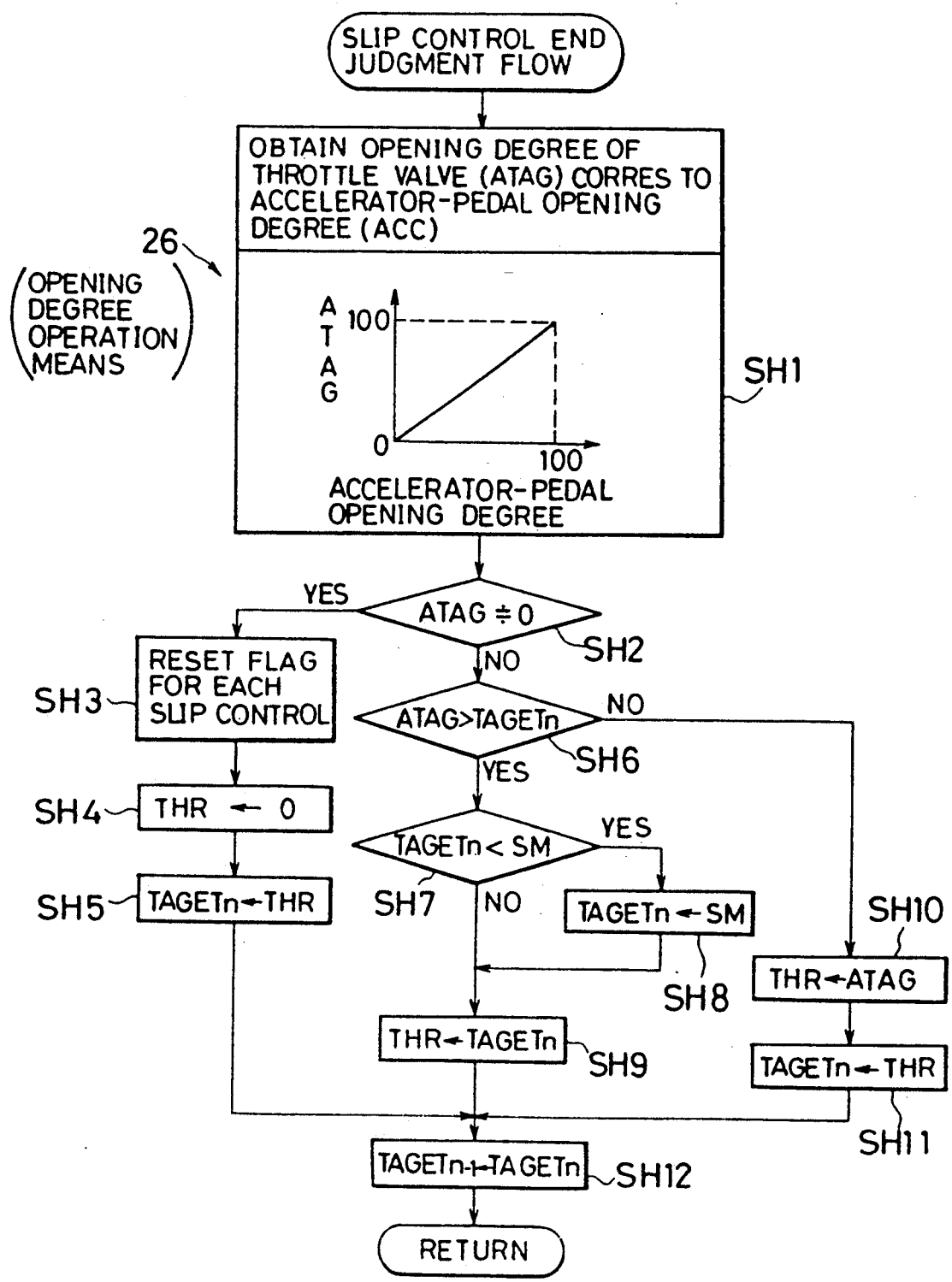

FIG. 11 corresponding to SM18 of FIG. 3

First at step SH1, there is obtained a target opening degree of the throttle valve, ATAG, in accordance with the opening degree of the accelerator pedal, ACC.

Thereafter, at step SH2, a value of the target opening degree of the throttle valve, ATAG, is judged. When the target throttle valve opening degree ATAG is approximately zero, each flag is reset at step SH3, the output THR to the throttle actuator 12 is set to zero at step SH4, and the output THR is given as a target control value TAGETn at step SH5, in order to end the slip control.

If ATAG≠0 at step SH2, the target throttle valve opening degree ATAG in proportion to the accelerator pedal opening degree is further judged at step SH6 whether it is larger than a target throttle valve opening degree, TAGETn, in the slip control. If ATAG->TAGETn at step SH6, the slip control is continued by judging at step SH7 whether or not the target throttle valve opening degree TAGETn is larger than a lower limit control value SM (an opening degree SM to be forcibly reduced immediately after occurrence of a first slip). If YES at step SH8, the target opening degree TAGETn is restricted to the lower limit control value SM and the flow goes to step SH9 where TAGETn is renewed to an output value THR to the throttle actuator 12. When it is judged at step SH7 that the target opening degree TAGETn is equal to or larger than the lower limit control value SM, this target throttle valve opening degree TAGETn is changed to the output value THR to the throttle actuator 12 at step SH9.

If ATAG≦TAGETn at step SH6, the flow proceeds to step SH10 and the target opening degree ATAG in proportion to the opening degree of the accelerator pedal is changed to the output value THR at step SH10 and then to the target control value TAGETn at step SH11 in order to control the throttle valve 10 by means of the target opening degree ATAG in proportion to the opening degree of the accelerator pedal.

Then at step SH12, the latest target control value TAGETn is updated to the previous target control value TAGETn−1, and the flow is then returned.

In accordance with the present invention, a slip detecting means is constructed such that a vehicle velocity with respect to pavement (an undriven wheel velocity WFN) is computed on the basis of the spin judgment flow of FIG. 4 and that slip values (slip ratios S) of the left-hand and right-hand driven wheel velocities WRR and WRL to the vehicle velocity WFN are detected. A feed-back control means 24 is constructed such that an opening degree of the throttle valve, Δ TAGET (Δ TAGET=K×Δ TAGETo, where K=1), in the feed-back control of the opening degree of the throttle valve is first operated so as for the slip value (slip ratio S) of the driven wheel 6 to reach a target value (a target slip ratio STA) in response to output from the slip detecting means 23 and the target throttle valve opening degree TAGETn (=TAGETn−1+Δ TAGET) is then operated, whereby a driving torque adjusting means 22 is to be subjected to feed-back control by means of a set response velocity (a basic throttle valve operation amount, Δ TAGETo=Δ TAGET) so as for the opening degree of the throttle valve 10 to reach the target throttle valve opening degree, Δ TAGETn, as at steps SM6, SM14, SM15, SM19, and SM20 in the control flow of FIG. 3 as well as at steps SF1–SF8 and SF11 in the feed-back control flow of FIG. 9.

A response velocity altering means 25 is constructed such that, only when the throttle operation value Δ TAGET is smaller than zero, i.e., Δ TAGET<0 (when the opening degree of the throttle valve is controlled so as to be decreased, namely, when the driving torque acting upon the driven wheel 6 is to be reduced), at the time of occurrence of a slip when the slip value (slip ratio S) of the driven wheel 6 is larger than the target value (target slip ratio STA) by a value larger than a set value (S1−STA), a value of the correction gain K of the basic throttle operation amount, Δ TAGETo, is set to K=1.2 when the zone is ZN2 (for example, a road covered with snow), and to K=1.5 when the zone is ZN1 (for example, a frozen road), and the throttle valve amount, Δ TAGET (=K×Δ TAGETo), is largely corrected to thereby largely correct the set response velocity (the throttle operation amount Δ TAGET) in the feed-back control of the feed-back control means 24.

Figure 12:
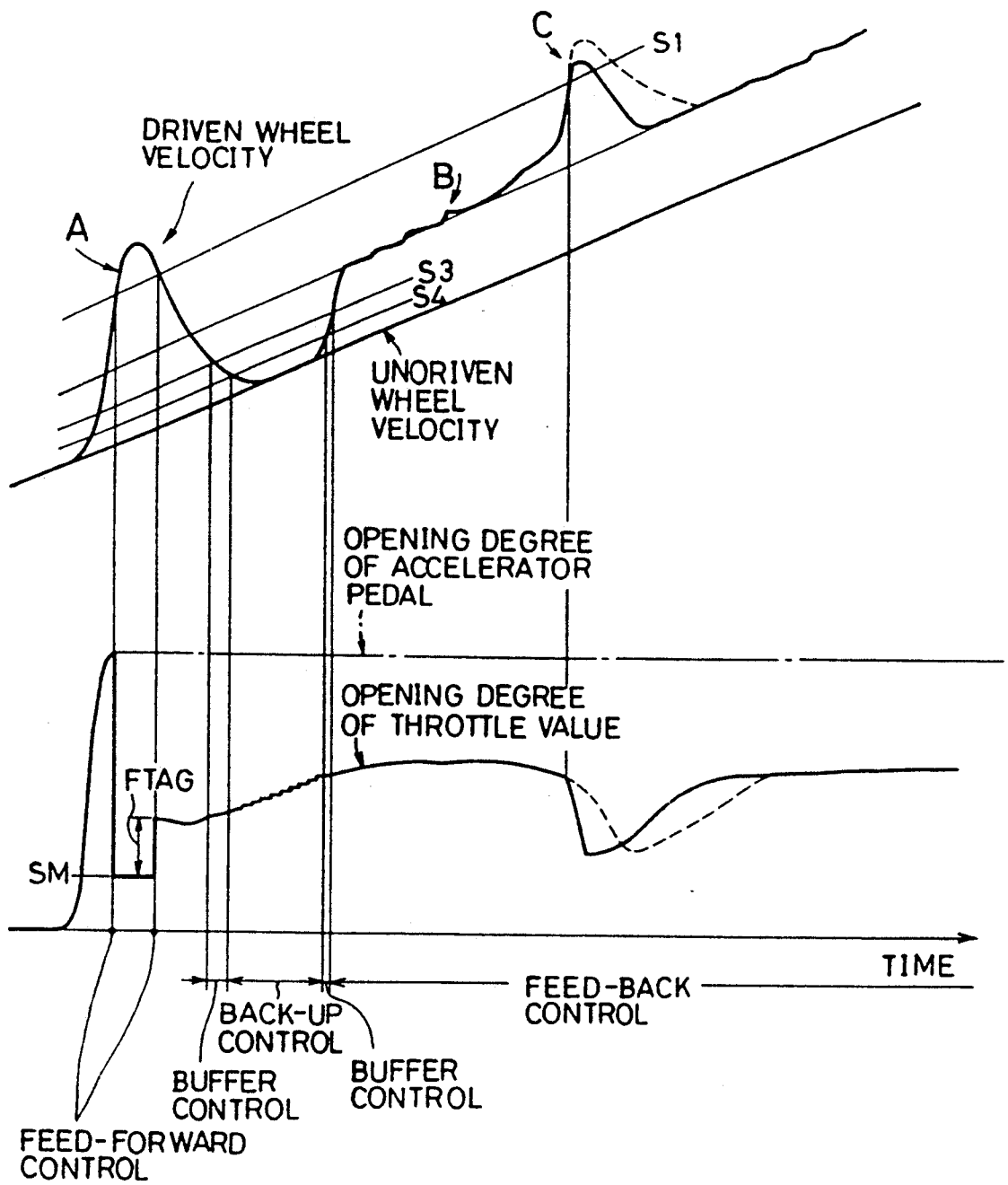
FIG. 12 is a time chart showing the content of a control according to one example of the present invention.

Therefore, in the embodiments as have been described hereinabove, as shown in FIG. 12, when a rotational velocity of the driven wheel 6 is accelerated as shown by the symbol "A" in the drawing and a slip occurs on the driven wheel or wheels 6 as the slip ratio S becomes equal to or larger than the spin judgment value S1 (first set value=second set value), the opening degree of the throttle valve 10 is controlled so as to be reduced to a large extent to a smaller opening degree SM. Immediately after the slip ratio S becomes below the value S1, namely, when the spin is converged, the opening degree of the throttle valve is returned at once by the recovery value FTAG from the lower limit value SM and then the driven wheels are subjected to feed-back control (PI-PD control). Thereafter, in order to prevent the slip ratio S from reducing to a large extent below the target value STA, the buffer control is carried out followed by the back-up control. When the revolutional velocity of the driven wheel 6 becomes accelerating, then the feed-back control (PI-PD control) is carried out after the buffer control. As a result, the slip ratio S is converged to the target slip ratio STA in a favorable manner as indicated by the symbol "B" in FIG. 12. It is to be noted herein that, in a state in which the slip ratio S of the driven wheel 6 is appreciably converged to the target slip ratio STA (in such a state as indicated by the symbol "B"), the spin flag SF is set to SF=0 (at the time of occurrence of no slip) and the correction gain K is K=1 (step SF8) so that the throttle operation amount Δ TAGET by means of the feed-back control (PI-PD control) is equal to the basic throttle operation amount Δ TAGETo. It is further to be noted that the proportional constant KP and integral constant KI to be used for computation of the basic throttle operation amount Δ TAGETo are smaller as the friction coefficient μ on pavement becomes lower. Thus the basic throttle operation amount Δ TAGETo becomes smaller as the friction coefficient μ on pavement becomes lower. Therefore, it is to be noted that the lower the friction coefficient μ, the smaller a change of the opening degree of the throttle valve in the feed-back control, namely, the smaller a change of driving torque acting on the driven wheel 6, thus permitting an efficient prevention of re-slippage of the driven wheel 6 and ensuring a favorable running stability of the vehicle even on a road having a low friction coefficient μ.

If the driven wheel 6 slips again in such a manner as indicated by the symbol "C" in FIG. 12 during the feed-back control, a reduction of the opening degree of the throttle valve is slower in the case of the basic throttle operation amount Δ TAGETo, as indicated by the broken line in the drawing, so that it takes a longer period of time to converge the slip ratio S of the driven wheel 6 to the target value STAG. In accordance with the present invention, however, when the driven wheel 6 spins again, namely, when the spin flag SP is SP=1, the correction gain K is set to K=1.2 for the zone ZN=2 (for example, a road covered with snow) and to K=1.5 for the zone ZN=1 (for example, a frozen road) to thereby alter the throttle operation amount Δ TAGETo (K×Δ TAGETo) (Δ TAGETo<0) in the direction of reducing the driving torque acting upon the driven wheel 6 to a large extent by means of the response velocity altering means 25. This arrangement facilitates a reduction of the opening degree of the throttle valve and this reduction velocity becomes faster as the friction coefficient μ on pavement gets smaller, thereby reducing the driving torque for the driven wheel 6 in a quicker manner and converging the re-slippage of the driven wheel 6 in a shorter period of time.

In this case, the throttle operation amount Δ TAGET (Δ TAGETo≧0) in the direction of increasing the driving torque acting upon the driven wheel 6 is equally retained at the basic throttle operation amount Δ TAGETo in which the correction gain K is set to K=1. Accordingly, if the re-slippage of the driven wheel 6 is converged and the throttle operation amount Δ TAGET becomes Δ TAGET≧0, a change of increasing the opening degree of the throttle valve is made slower as it was, thereby effectively preventing a re-slippage of the driven wheel 6.

The present invention has now been described by way of examples, and it is further to be understood that the slip control can be made by either of the engine control or the brake control and that, when the slip control is carried out by both the engine and brake control, a target value for the feed-back control may be arranged such that the target value STB for the brake control becomes smaller than the target value STA for the engine control although STA is smaller than STB in this embodiment as indicated by STAo and STBo in FIG. 6 and at step SD4 in FIG. 7.

The present invention may be embodied in other specific forms without departing from the spirit and scope thereof. The present embodiments as have been described hereinabove are therefore to be considered in all respects as illustrative and not restrictive, the scope of the invention being indicated by the appended claims, and all the changes, modifications and variations which come within the meaning and range of equivalency of the claims are therefore intended to be encompassed within the spirit and scope of the invention.

What is claimed is:

1. A slip control apparatus of a vehicle, comprising:
    a driving torque adjusting means for adjusting driving torque acting on a driven wheel;
    a slip detecting means for detecting a slip value of the driven wheel with respect to a road surface;
    a feed-back control means for subjecting said driving torque adjusting means to feed-back control at a set response velocity so as to allow the slip value detected by said slip detecting means to reach a given target value;
    a friction coefficient detecting means for continuously detecting a friction coefficient on the road surface; and
    a response velocity altering means for increasing said set response velocity in the direction of reducing the driving torque acting upon the driven wheel when the slip value detected by said slip detecting means during the feed-back control by said feed-back control means is equal to or larger than a given value which is larger than said target value, compared with when the slip value is smaller than said set value.

2. A slip control apparatus as claimed in claim 1, further comprising road state determining means to determine a state of a road surface, and an amount altering means for altering an amount by which the set response velocity is to be altered by said response velocity altering means in accordance with the state of the road surface as determined by said road state determining means.

3. A slip control apparatus as claimed in claim 2, wherein said amount altering means alters the amount to a larger degree when the friction coefficient on the road surface is below a predetermined frictional coefficient threshold value.

4. A slip control apparatus as claimed in claim 1, wherein said driving torque adjusting means is to adjust an output power or torque from an engine.

5. A slip control apparatus as claimed in claim 4, wherein:
    said engine is of Otto type in which the output power or torque from the engine is adjusted by an amount of intake air;
    said driving torque adjusting means comprises at least a throttle valve for adjusting the amount of intake air to be fed to said engine; and
    said set response velocity is a velocity at which the throttle valve is operated.

6. A slip control apparatus as claimed in claim 1, wherein said driving torque adjusting means comprises an output adjusting means for adjusting an output power or torque from an engine, and a braking force adjusting means for adjusting a braking force to be applied to the driven wheel.

7. A slip control apparatus as claimed in claim 6, wherein said set response velocity is determined by a first set response velocity which is a velocity at which said output adjusting means is operated and by a second set response velocity which is a velocity at which said braking force adjusting means is operated.

8. A slip control apparatus as claimed in claim 7, wherein said response velocity altering means is to alter said first set response velocity only.

9. A slip control apparatus as claimed in claim 1, further comprising a friction coefficient detecting means for detecting a friction coefficient on the road surface;
    wherein said set response velocity and the amount to be altered by said response velocity altering means are both altered in accordance with the friction coefficient detected by said friction coefficient detecting means.

10. A slip control apparatus of a vehicle, comprising:
    a driving torque adjusting means for adjusting driving torque acting on a driven wheel;
    a slip detecting means for detecting a slip value of the driven wheel with respect to a road surface;
    a first slip control means for reducing the driving torque acting upon the driven wheel rapidly by a given portion by subjecting said driving torque adjusting means to feed-forward control when the slip value detected by said slip detecting means becomes above a first set value;
    a second slip control means for subjecting said driving torque adjusting means to feed-back control at a set response velocity so as to allow the slip value detected by said slip detecting means to reach a given target value smaller than said first set value after control by means of said first slip control means; and
    a response velocity increasing means for altering said set response velocity in the direction of reducing the driving torque acting upon the driven wheel during slip control by means of said second slip control means when the slip value detected by said slip detecting means is equal to or larger than a second set value larger than said target value, compared with when the slip value is smaller than said second set value.

11. A slip control apparatus as claimed in claim 10, wherein said first set value is set to be the same as said second value.

12. A slip control apparatus as claimed in claim 10, further comprising:
    a third slip control means for increasing driving torque acting upon the driven wheel by a given portion rapidly by subjecting said driving torque adjusting means to feed-forward control prior to slip control by means of said second slip control means when the slip value detected by said slip detecting means becomes equal to or lower than said first set value by means of slip control by said first slip control means.

13. A slip control apparatus of a vehicle, comprising:

a driving torque adjusting means for adjusting driving torque acting on a driven wheel;

a slip detecting means for detecting a slip value of the driven wheel with respect to a road surface;

a feed-back control means for subjecting said driving torque adjusting means to feed-back control at a set response velocity so as to allow the slip value detected by said slip detecting means to reach a given target value;

a friction coefficient detecting means for continuously detecting a friction coefficient on the road surface;

a first response velocity altering means for decreasing said set response velocity when the friction coefficient detected by said friction coefficient detecting means is smaller than previously detected;

a second response velocity altering means for increasing said set response velocity in the direction of reducing the driving torque acting upon the driven wheel when the slip value detected by said slip detecting means during the feed-back control by said feed-back control means is equal to or larger than a given set value larger than said target value, compared with when the slip value is smaller than said set value; and an amount altering means for altering an amount by which said set response velocity is to be altered by said second response velocity altering means which becomes larger when the friction coefficient detected by said friction coefficient detecting means is smaller than previously detected.

* * * * *